J. A. & G. H. AUPPERLE.
INSERTED TOOTH SAW.
APPLICATION FILED MAY 7, 1908.

912,774.

Patented Feb. 16, 1909.

WITNESSES:

INVENTORS.
James A. Aupperle.
George H. Aupperle
BY

ATTORNEY

UNITED STATES PATENT OFFICE.

JAMES A. AUPPERLE AND GEORGE H. AUPPERLE, OF INDIANAPOLIS, INDIANA, ASSIGNORS OF THIRTY-FIVE ONE-HUNDREDTHS TO JOHN COYLE, OF INDIANAPOLIS, INDIANA.

INSERTED-TOOTH SAW.

No. 912,774.   Specification of Letters Patent.   Patented Feb. 16, 1909.

Application filed May 7, 1903. Serial No. 431,323.

*To all whom it may concern:*

Be it known that we, JAMES A. AUPPERLE and GEORGE H. AUPPERLE, both of Indianapolis, county of Marion, and State of Indiana, have invented a certain new and useful Inserted-Tooth Saw; and we do hereby declare that the following is a full, clear, and exact description thereof, reference being had to the accompanying drawings in which like letters refer to like parts.

The object of this invention is to improve the construction of saws provided with inserted teeth. It is an improvement over the arrangement and construction shown in the patent to John Coyle, No. 579,383, dated March 23, 1897.

One object of the invention is to make a construction that will omit the spring shown in the Coyle device which locks the tooth to the projection from the saw blade. This is accomplished chiefly by making the sleeve which holds the saw tooth to the projection from the blade open at one end and of spring metal so that the cut end can be spread somewhat while inserting the sleeve on the projection from the saw blade and its cut ends will come together, clamp-like, after the sleeve is moved into its permanent position under a shoulder on the projection from the saw blade. This spring sleeve will effectually hold the tooth in place and without a separate spring, the springing action being a function of the sleeve itself.

Another feature of the invention consists in providing shoulders on the tooth overlapping the edges of the sleeve so that sawdust will be kept from entering between the sleeve and the tooth.

Figure 1:
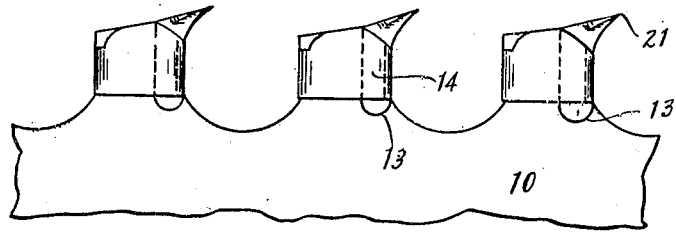
Figure 2:
Figure 3:
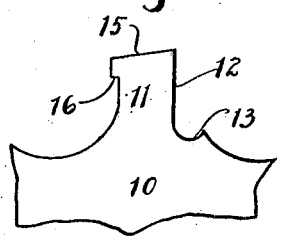
Figure 4:
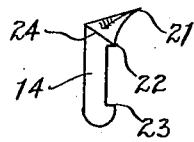
Figure 5:
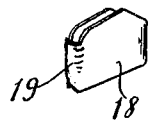
Figure 6:
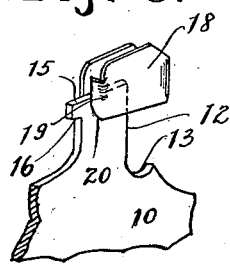
Figure 7:
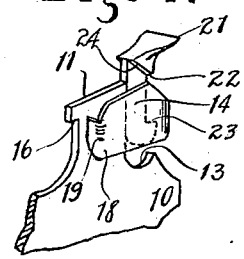
Figure 8:
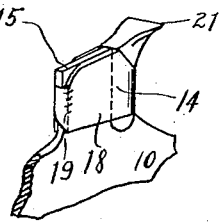

These and the other features of this invention will be understood from the accompanying drawings and the following description and claims:

In the drawings Figure 1 is a side elevation of a part of a saw, showing three inserted teeth, the remainder of the saw being broken away. Fig. 2 is a plan view of Fig. 1. Fig. 3 is a side elevation of a portion of the saw blade and one projection therefrom to which a tooth is to be secured. Fig. 4 is a side elevation of the tooth detached. Fig. 5 is a perspective view of the sleeve for securing the tooth to the projection. Figs. 6, 7 and 8 are perspective views of a portion of the saw blade and the projection therefrom, illustrating the different stages in the operation of securing the tooth to the saw blade.

In detail 10 is the saw blade and it may be a straight blade like that of a band saw or a circular saw. In fact, the invention is not limited to any particular form of saw or saw blade but may apply to many forms. From the saw blade 10 there are at intervals projections 11 extending therefrom. These projections have a substantially straight edge 12 extending from the saw blade with a regular concave recess 13 in the edge of the saw blade near the projection to snugly receive the rounded lower end of the saw tooth 14. The upper edge 15 of the projection 10 is slightly inclined downwardly towards the rear. On the rear edge of the projection 11 there is a shoulder 16 near the outer end of said projection and leaving a recess to receive the end of the sleeve 18. The sleeve 18 is formed of one piece of spring metal that is adapted to surround the projection 11 from the saw blade. It, therefore, has two sides integral along the front edge of the sleeve and separated along the bottom, top and rear edges thereof, but one of the sides has a transverse projection 19 that extends across to the other side and overlaps the rear edge of the other side of the sleeve. Normally, and before the sleeve is put in place the two sides spring together or lie closely together at their rear edges so that the rear edges of the sides must be sprung apart to insert the sleeve on a projection, as shown in Fig. 6. The lower edge 20 of the flange 19 is beveled so that the rear end of the sleeve 18 may be driven down over the tooth in the manner shown in Fig. 6, by a hammer or other means, to the position shown in Fig. 7. When in that position the tooth 14 is inserted.

The tooth 14 has a cutting edge 21, a transverse shoulder 22 near the cutting edge, another transverse shoulder 23 near the lower end so as to leave a recess between the shoulders 22 and 23 for the sleeve to fit into. There is also a shoulder 24 on each side of the tooth inclined as shown in Figs. 4 and 7 and adapted to overlap the edges of the sleeve.

When the sleeve is driven down to the position shown in Fig. 7, as stated, the tooth is inserted and pushed down to its seat 13 and then the sleeve is forced rearwardly into the position shown in Fig. 8. The two sides of the sleeve 18 spring towards each other and tightly hug the projection 11 and the flange 19 at the rear of the sleeve springs across the rear edge of the projection 11 and fits under the shoulder 19. The front edge of the sleeve fits in the recess of the tooth between the shoulders 22 and 23. Therefore, the tooth is rigidly secured to the projection and nothing is required to hold the tooth in place but the sleeve alone.

What we claim as our invention and desire to secure by Letters Patent is:

1. In a saw, a projection from the blade thereof, an insertible tooth, and a spring sleeve yieldable laterally of the tooth only that surrounds the projection and tooth and clamps the projection and holds the tooth in place.

2. In a saw, a projection from the blade thereof, an insertible tooth, and a spring sleeve that surrounds the projection and tooth to hold the latter in place, said sleeve being separated at one end and adapted to spring together when put in place.

3. In a saw, a projection from the blade having a shoulder on its rear edge near the outer end thereof, an insertible tooth adapted to engage the front edge of said projection and having a shoulder near the outer end thereof, and a spring sleeve adapted to surround said projection and tooth near one end of the sleeve fitting under the shoulder on the tooth and the other end of the sleeve separated and having a flange adapted to lie under said shoulder on the projection.

4. In a saw, a projection from the blade having a shoulder on its rear edge near the outer end thereof, an insertible tooth adapted to engage the front edge of said projection and having a shoulder near the outer end thereof, and a spring sleeve adapted to surround said projection and tooth near one end of the sleeve fitting under the shoulder on the tooth and the other end of the sleeve separated and having a flange adapted to lie under said shoulder on the projection, the inner portion of said flange being beveled away so that the separated end of the sleeve can be driven astride the projection while the sleeve is being put in place.

5. In a saw, a projection from the blade thereof having a shoulder on its rear edge near the outer end of the projection, a tooth with a shoulder on the front edge near the outer end thereof, and a shoulder on each side of the tooth, and a spring sleeve adapted to fit under the shoulders of the tooth at one end and being separated at the other end with a flange that springs under the shoulder on said projection, substantially as set forth.

In witness whereof, we have hereunto affixed our signatures in the presence of the witnesses herein named.

JAMES A. AUPPERLE.
GEORGE H. AUPPERLE.

Witnesses:
J. H. SWAN,
OLIVE BREEDEN.